United States Patent [19]

Sasadi

[11] 4,125,195

[45] Nov. 14, 1978

[54] DRY ROCK LOADING SPOUT SYSTEM

[75] Inventor: John Sasadi, Ramsey, N.J.

[73] Assignee: EDC Inc., Ramsey, N.J.

[21] Appl. No.: 780,673

[22] Filed: Mar. 23, 1977

[51] Int. Cl.² .................... B65G 11/12; B65G 11/14; B65G 67/06

[52] U.S. Cl. ................. 214/41 R; 141/284; 141/387; 193/16; 193/30; 214/17 C

[58] Field of Search ............ 214/18 PH, 17 C, 17 B, 214/41 R, 35 R; 141/387, 284, 279, 35; 193/3, 16, 23, 30, 15, 17, 22

[56] References Cited

U.S. PATENT DOCUMENTS

| | | | |
|---|---|---|---|
| 392,171 | 10/1888 | Tromanhauser et al. | 193/16 X |
| 1,192,485 | 7/1916 | Wray | 193/23 X |
| 1,242,482 | 10/1917 | Shotwell | 193/23 |
| 1,268,219 | 6/1918 | Cooley | 193/16 X |
| 1,539,559 | 5/1925 | Hamachek | 193/16 X |
| 1,814,618 | 7/1931 | Carter | 193/16 X |
| 2,204,019 | 6/1940 | Koppers | 214/18 PH X |
| 2,708,542 | 5/1955 | Gray et al. | 141/35 X |
| 3,455,333 | 7/1969 | Bily | 137/615 |
| 3,628,676 | 12/1971 | Tucker | 214/18 PH X |
| 3,716,150 | 2/1973 | Echterhoff et al. | 214/35 R |
| 3,944,090 | 3/1976 | Flood | 214/41 R X |

Primary Examiner—L. J. Paperner
Assistant Examiner—Carl Rowold
Attorney, Agent, or Firm—Shenier & O'Connor

[57] ABSTRACT

An array of an assembly of spouts for translating comminuted dry material from a bin having a number of output openings to various railway cars, respective ones of which have hatch openings of different relative dispositions and of different heights while inhibiting pollution of the ambient atmosphere by the material, in which each assembly comprises an upper section pivotally connected to the bin outlet for movement around a vertical axis, a lower section comprising vertically telescoping members, one of which carries a shroud adapted to make a seal with the car hatch, and an intermediate section pivoted to each of the upper and lower sections, together with means for driving the upper section to pivot the entire assembly over a limited arc around a vertical axis, means for swinging the intermediate section around a horizontal axis, while positively maintaining the lower sections substantially vertical, and means for moving the lower telescopic sections relative to each other, all of these movements being designed to accommodate the variety of cars for which the array is to be used. The system readily lends itself to automation. It is provided with means for minimizing the danger of injury to workers in the region of the installation. In addition, the spout assemblies are adapted to be moved to positions at which they permit the locomotive to move through the space under the bin without interference with the spout assemblies.

18 Claims, 13 Drawing Figures

DRY ROCK LOADING SPOUT SYSTEM

BACKGROUND OF THE INVENTION

There are known in the prior art installation at which dry comminuted materials, such for example as powdered minerals must be loaded from a bin into railway cars adapted to transport the material to locations at which it is to be distributed. Present day concern for protection against the dangers of polluted atmosphere dictates that the operation of transferring material from such bins into railway cars be accomplished in a substantially dust-free manner. It is further desirable that the operation be achieved substantially automatically. A major obstacle to the achievement of these objects is the wide variety of cars into which the material is to be loaded for transport. As many as 150 different types of such cars are known. The various cars have different arrangements of loading hatches and have different elevations of hatch openings, all of which must be accommodated. Research in connection with the association of the wide variety of cars with such bins has lead to an optium arrangement of bin outlets. This optium arrangement of bin outlets, however, is only the first step in achieving the desirable results outlined hereinabove of transferring material from the bins to the cars by accommodating the wide variety of cars, while at the same time avoiding pollution of the ambient atmosphere.

SUMMARY OF THE INVENTION

I have provided a loading system for transferring comminuted dry material from a bin to a railway car without polluting the ambient atmosphere with the material being loaded. My system meets industry standards as to pollution. It is readily adapted to use with a wide variety of railway cars, respective ones of which have different hatch configurations and hatches of different heights. My system includes a plurality of spout assemblies, so arranged as to accommodate hatches at various locations around a vertical axis extending through the bin opening and of accommodating hatches at various heights. My assemblies provide a seal between the spout and the hatch opening. My assemblies are so arranged as to minimize the danger to persons working in the area of the installation. I so construct the spout assemblies of my system as to permit of the passage of a locomotive under the loading bin, while at the same time accommodating the various hatch configurations and elevations of cars to be loaded. My system readily lends itself to automated operation.

One object of my invention is to provide a system for translating comminuted dry materials from a bin to a railway car without polluting the ambient atmosphere.

Another object of my invention is to provide a system for translating dry comminuted material from a storage bin to a railway car while, at the same time, meeting industry's standards relating to pollution.

A further object of my invention is to provide a system for transferring dry comminuted material from a bin to a railway car, which system is adapted to acommodate various railway cars having different respective hatch arrangements and different hatch opening elevations.

Another object of my invention is to provide a dry comminuted material transfer system including spout assemblies having outlet openings which are adapted to be moved angularly around to various positions with reference to the vertical center line of the bin opening and to be positioned vertically, so as to accommodate a wide variety of relationship of a railway car hatch opening to the bin discharge opening.

A still further object of my invention is to provide a system for transferring dry comminuted material from a loading bin to railway cars, which protects persons working at the installation against the danger of injury from moving spouts.

A still further objet of my invention is to provide a system of loading spout assemblies, which can be moved to positions at which they permit passage of a locomotive through the space beneath the weighing bin.

Still another object of my invention is to provide a loading spout assembly, which readily permits the automation of the operation of transferring dry comminuted material from a bin to a railway car.

Yet another object of my invention is to provide a loading spout assembly which permits all assemblies at an installation to be withdrawn to their home positions in response to operation of a single switch in the event that the car being loaded moves for any reason before the assemblies have intentionally been withdrawn.

Other and further objects of my invention will appear from the following description.

In general, my invention contemplates the provision of an array of spout assemblies, each of which includes an upper section, the input to which is connected to one of the output openings of a bin for limited relative rotary movement of the assemblies around a vertical axis extending through the opening, an output section comprising two telescoping members, and an intermediate member pivotally connected to the upper section and to the lower section for movement around respective horizontal axes and provided with means for lifting the intermediate section to permit relative pivotal movement of the upper and lower sections with respect thereto, while holding the lower section vertical or generally parallel to the upper input section. I provide my system with means for operating the means for rotating the assembly around the vertical axis of the bin outlet for operating the intermediate section lifting means and for operating the lower telescoping section, so as to orient the lower sections with hatches, having different various relationships to the bin outlet opening, while at the same time forming a seal with the hatches.

BRIEF DESCRIPTION OF THE DRAWINGS

In the accompanying drawings to which reference is made in the accompanying specification and in which like reference characters are used to indicate like parts in the various views.

DESCRIPTION OF THE PREFERRED EMBODIMENT

Referring now more particularly to FIGS. 1 to 5 of the drawings, a weighing bin 10, or the like, of the type adapted to store a predetermined amount of comminuted material includes two pairs of legs 12 and 14 which support the bin at a sufficient distance of ground level to permit railway cars to be loaded to pass under the bin and so as not to interfere with the apparatus to be described for transferring the material from the bin 10 to the car. As is known in the art, when the bin contains a predetermined weight of material to be transferred to a railway car, a a plurality of hoppers 16, usually eight in number, are adapted to deliver the material through outlet openings 18, when the operator opens these outlets.

Further, as has been pointed out hereinabove, the optimum arrangement of openings 18 to accommodate cars of different types is shown by the dot-dash line openings 18a to 18h of FIGS. 2 to 5. Various types of cars are loaded from bins such as the bin 10. For example, one type of car 20, which may be termed a "slot" car, has a flange 22 surrounding an elongated slot 24 in the top of the car through which material from the bin is to be delivered into the car. After the car has been filled, the slot 24 is closed by any suitable means known to the art. My apparatus for transferring material from the bin 10 to the car 20 includes a number of respective transfer spout assemblies indicated generally by the reference characters 26a to 26h equal to the number of hoppers openings 18a to 18h on the bin 10. As has been pointed out hereinabove, the usual bin has eight outlet hoppers, so that in the particular installation shown in the drawings there are eight transfer assemblies 26. Each of the transfer assemblies 26 includes an upper section indicated generally by the reference character 28, an intermediate section indicated generally by the reference character 30, a lower section indicated generally by the reference character 32, and a shroud 34. As will more fully be pointed out hereinbelow, my transfer assemblies 26 are adapted to be actuated so as to facilitate the transfer of material from a bin 10 to any one of a number of different railway cars, all without undesirable pollution of the atmosphere in the transfer area by the material being delivered from the bin to the car.

In use of my transfer assemblies 26 with a car such as the car 20, the assemblies are actuated in a manner to be described so that all of the shrouds 34 cooperate with the slot flange 22 to prevent escape of material being delivered. Moreover, in the course of this operation, the shrouds 34 are aligned, preferably in abutting relationship, along the length of the slot 24. Further, each of the shrouds 34 forms a seal with the slot flange 22 so as to ensure against escape of the material being delivered.

Figure 3:
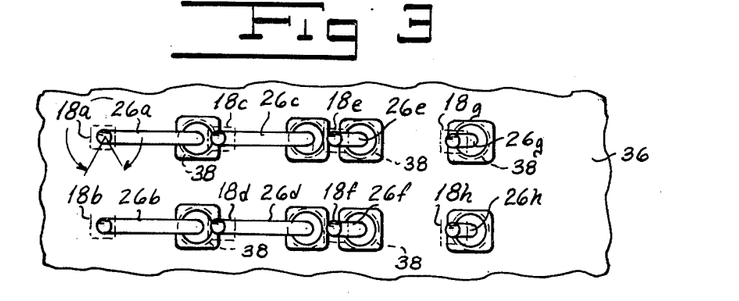
FIG. 3 is a schematic view illustrating the relationship of the various spout assemblies of my system to another type of car.

Further, by way of example, in FIG. 3 I have schematically illustrated the use of my transfer spout assemblies 26 in association with a car 36 of another construction. This car known as a "8-4-8" car has a plurality of loading hatches 38, through which the respective transfer spout assemblies are to deliver material from the bin 10, while preventing the escape of any excessive amount of material to the surrounding atmosphere. Further as is known in the art, once the car has been loaded, the hatches 38 are covered as the car is transported from one location to another.

Figure 4:
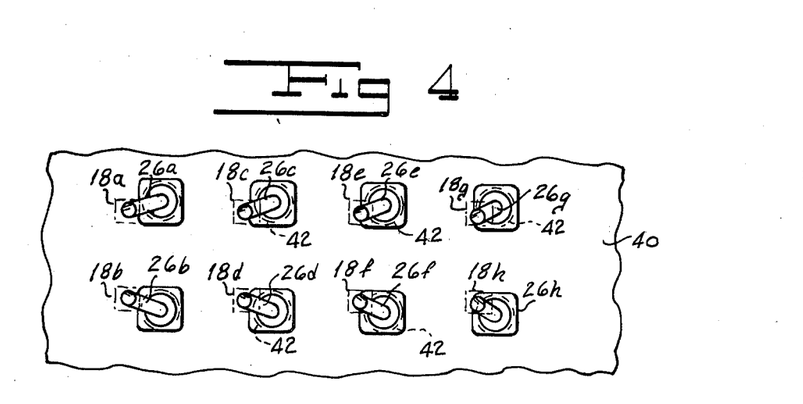
FIG. 4 is a schematic view illustrating the relationship of the various spout assemblies of my system in use with still another type of railway car.

Referring to FIG. 4, yet another type of railway car 40 with which my transfer spout assembly may be used is known as a "8-8-8" car, having a plurality of hatches 42, relatively disposed in the manner illustrated in FIG. 4. As is pointed out more fully hereinbelow, my transfer spout assemblies 26 may be automatically oriented so as to deliver material to the car 40, through the hatches 42 while preventing escape of excessive material to the surrounding atmosphere. Further, as will more fully be pointed out hereinbelow, knowing the type of car which is coming into position under the bin 10 for loading, a commutator may be so programmed as automatically to position the transfer assemblies 26 to deliver the material to the particular hatch arrangement of the car.

Figure 5:
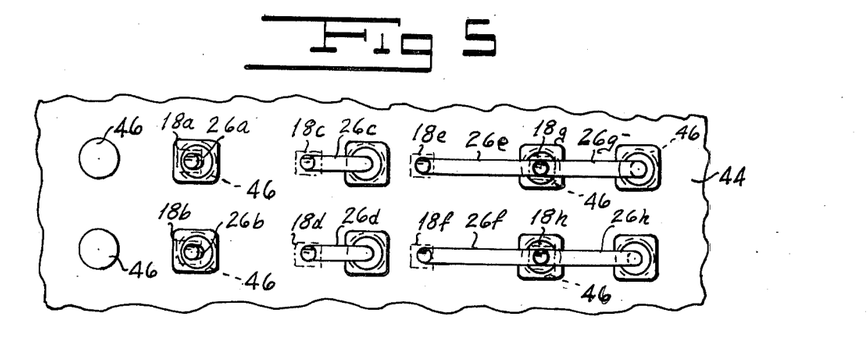
FIG. 5 is a schematic view illustrating the relationship between the various spout assemblies of my system and yet another type of railway car.

Finally, in FIG. 5 I have illustrated yet another car 44 having a rather unusual arrangement of ten hatches 46 through which material is to be delivered from the bin 10. In this Figure we have, moreover, schematically illustrated the configuration of the various transfer assemblies necessary to effect the transfer of the material from the bin to the car 44. While we have illustrated a number of different railway cars with which my transfer spout assembly 26 can be used to deliver material from the bin 10 to the car, it will readily be appreciated that cars having many other configurations can be used. Moreover, as will more fully be explained hereinbelow, my transfer spout assembly may be moved to a position to accommodate the passage of a locomotive through the space under the bin without interference with the transfer assemblies. In addition, the transfer assembly movement is limited to avoid danger to personnel working in the region of the bin. It is to be noted further that, as a practical matter, it is not necessary to reorient the transfer spout assemblies each time a car moves into position under the bin. This results from the fact that, in making up trains normally cars at the same time are arranged in series in the train. Thus, once the transfer spout assemblies 26 have been oriented to a particular hatch or slot configuration, they remain in this orientation for a period of time necessary to locate a series of cars at the same time. It is only necessary that a portion of the spout be raised out of the hatch as a fully loaded car moves away and prior to the time at which a new car moves into position under the bin 10.

Viewed from the top, as in FIGS. 2 to 5, each of my shrouds may be considered to move in a polar coordinate system with reference to a vertical axis of the associated outlet opening 18, with both the angle of orientation relative thereto and the length of the radius therefrom varying. It will be appreciated from the description hereinbelow that the shroud also has motion in a third coordinate which is elevation.

In one common type of storage bin 10 of the prior art, the outlet opening 18 is a square 13 inch by 13 inch opening. Referring now to FIGS. 6 to 9, a flange 48 has a square 13 inch by 13 inch opening 50, which registers with the hopper outlet opening when the flange 48 is secured to the hopper by means of screws or any other suitable means. A downwardly directed cylindrical extension 52 on the flange 48 is received in the upper end of a rubber sleeve 54 having an inner circular cross-sectional shape. Any suitable means such, for example, as a pair of clamping rings 56 may be employed to secure the sleeve 54 to the extension 52. The lower end of the sleeve 54 extends into the upper end of a steel upper cylindrical portion 58 of the upper spout section 28. I provide the cylindrical portion 58 with an upper flange 60 to which I secure a sprocket wheel 62 by any suitable means, such for example as bolts, or the like (not shown). Sprocket wheel 62 is adapted to be rotated in a manner to be described to rotate the entire transfer spout assembly 26 around a generally vertical axis.

I form the piece 58 with a pair of spaced intermediate flanges 64 and 66. A plurality of support rollers 68, 70, and 72 mounted for movement around horizontal axes on brackets 74 carried by a deck plate 76 supported by angle irons 78 carried by frame members 80 are disposed between the spaced intermediate flanges 64 and 66, so as to support the entire transfer spout assembly 26. I provide the assembly with a plurality of spaced flange edge guide rollers 82, 84, and 86, carried for movement around vertical axes on respective roller brackets 88 secured to plate 76. It will readily be appreciated that the rollers 82, 84, and 86 cooperate with the edge of the lower flange 66 of the spaced intermediate flanges 64 and 66.

I secure a transition piece 90 to the lower end of the face 58. This transition piece 90 changes the internal cross-sectional shape of the upper section 28 from generally circular to generally square or rectangular. A curveed lower extension 92 on the transition piece 90 likewise has a generally rectangular cross-section and is so curved as to facilitate pivotal movement of the intermediate section to be described.

Extension 92 is adapted to be received in the curved upper end 94 of the intermediate piece 96 of the intermediate section 30. It will readily be apparent that the construction just described permits of pivotal movement of the intermediate section 96 around a generally horizontal axis passing through extension 92 and the upper end 94. Preferably, I provide a wiper 93 which acts as a seal between extension 92 and the upper end 94 to prevent the escape of material through the space between the extension and upper end.

I weld or otherwise secure a pair of picot brackets 98 to opposite sides of the transition piece 90 just above the curve at the lower extension thereof. Pivot brackets 98 carry a pin 102 which receives the upper ends of respective arms 104 and 106. These arms 104 and 106 have intermediate bends 108 along the lengths thereof. I weld or otherwise secure the bends 108 to opposite ends of brackets 112 secured to both sides of the intermediate piece 96 as viewed in FIG. 6.

Referring now to FIGS. 6 and 10 to 12, I provide the intermediate piece 96 with a curved lower portion 114 which is received in a curved piece 116 of the lower assembly. I secure the lower ends 118 of arms 106 and 108 to corresponding ends of a pair of cross brackets 122 and 124 secured to the member 116.

I secure the upper ends of respective length adjustable parallel motion rods 126 and 128 to pivots 130 on a sub frame 132 of the apparatus. A pivot pin 134 carried by the ends of brackets 122 and 124 remote from the lower ends 118 of arms 106 and 108 receives the lower ends of the rods 126 and 128. For purposes of rigidity, I weld respective pipe braces 136 between the upper and lower ends of the lifting arms 104 and 106. Additional reenforcing structure may be provided between the two parallel motion rods 126 and 128, if desired. The linkage between the upper section 28 and the lower section 32 acts as a pantographic linkage to maintain the lower section vertically oriented.

Figure 10:
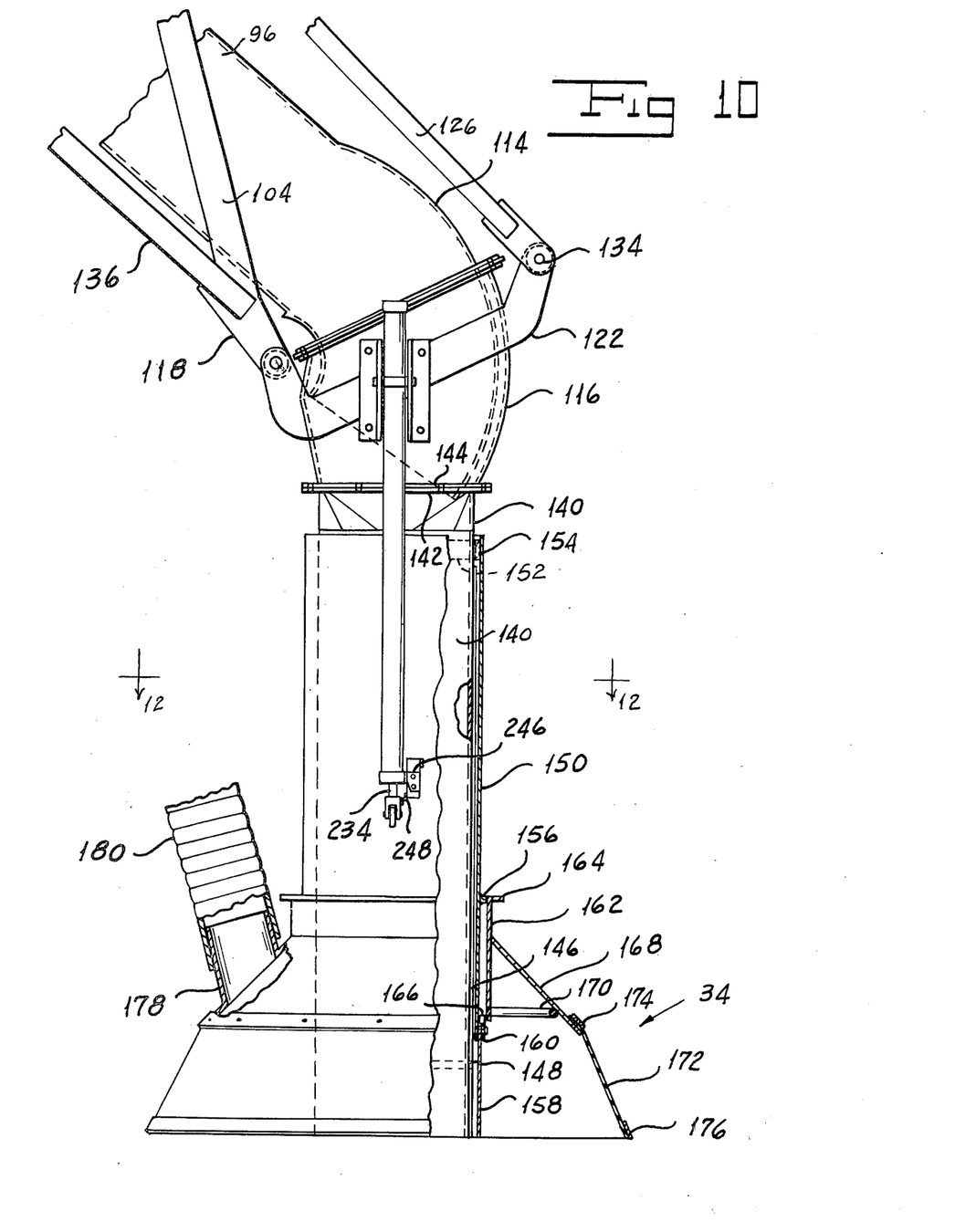
FIG. 10 is an elevation of the lower portion of the intermediate section and of the lower section of one of my loading spout assemblies, with parts broken away and with other parts shown in section.
Figure 11:
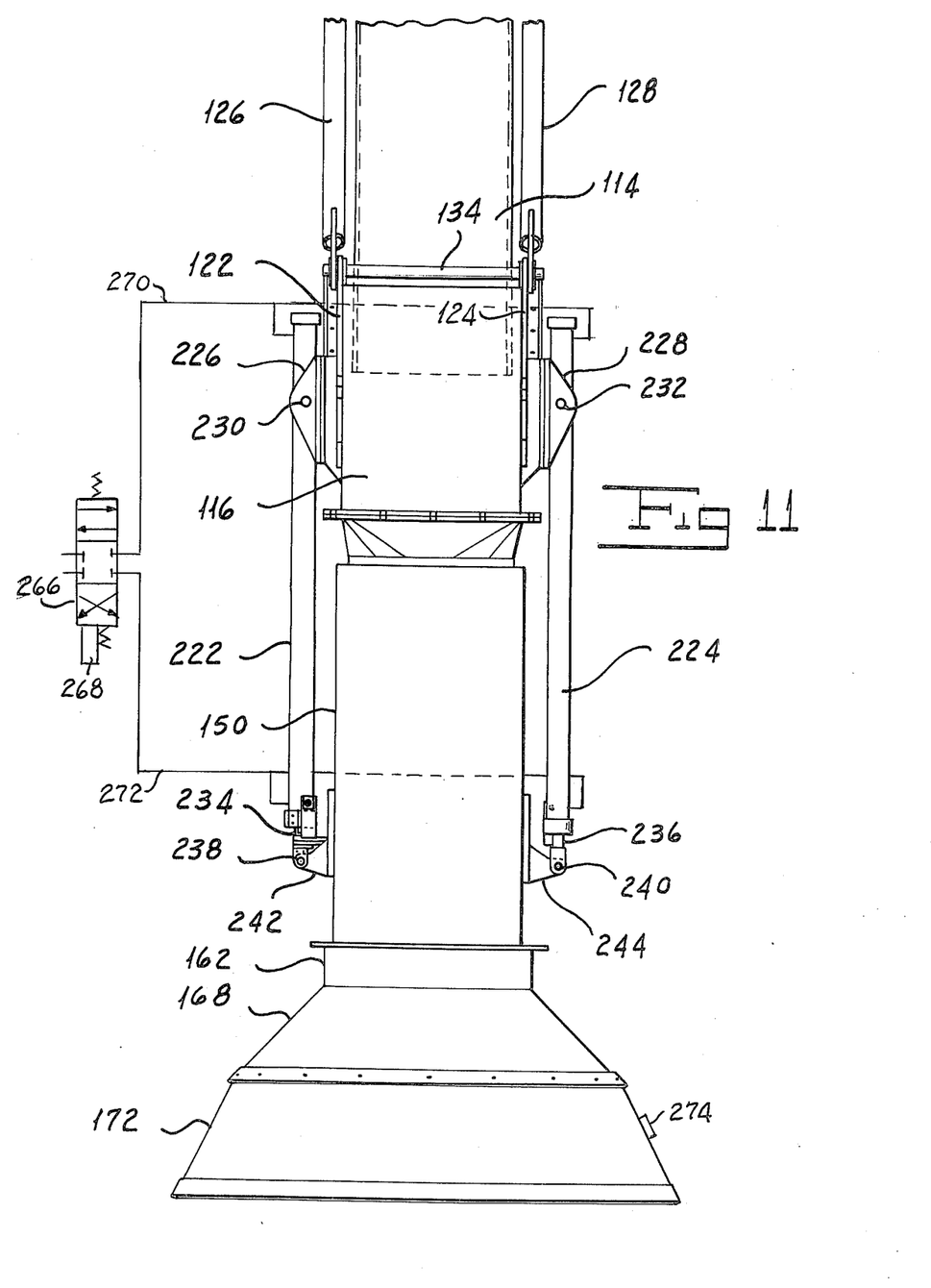
FIG. 11 is a front elevation of the apparatus shown in FIG. 10.
Figure 12:
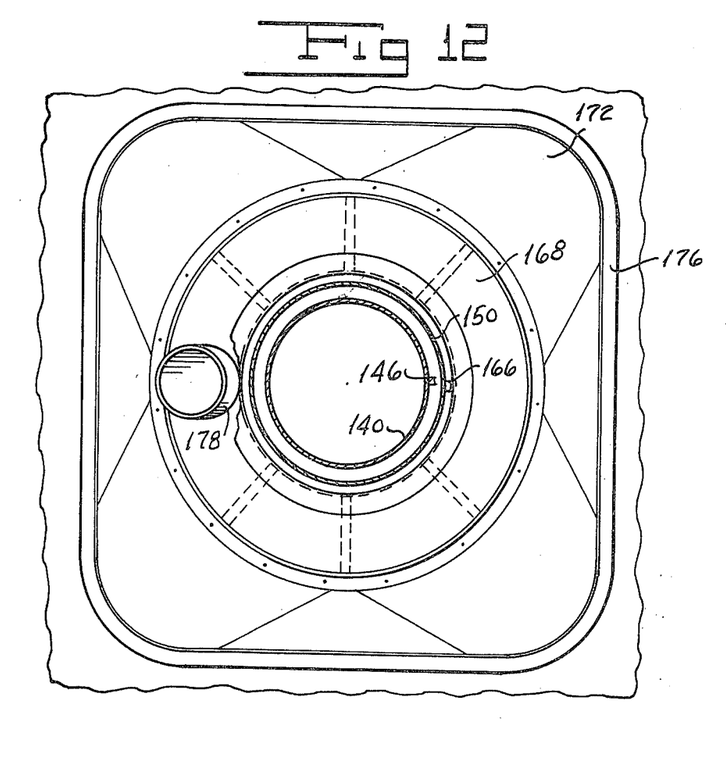
FIG. 12 is a sectional view of the apparatus shown in FIG. 10, taken along the line 12—12 thereof.

The lower section 32 of the assembly 26 includes an inner cylindrical member 140 having a circular cross-sectional shape over the majority of the extent thereof. I secure a flange 142 at the upper end of the member 140 to a flange 144 at the lower end of member 116 by any suitable means. I form the outer surface of the sleeve or conduit 140 with a vertical guide rib 146 along one side thereof. This guide rib 146 extends from a location spaced below the flange 142 to a stop 148 surrounding the conduit 140 at a location spaced above the lower end thereof. It is to be noted that the portion of the member 140 between the flange 142 and the upper end of the guide rib 146 provides a transition between a square cross-sectional shape at the flange 142 to a circular interior cross-sectional shape from the top of guide 146 downwardly to the end of the member 140.

The inner conduit or sleeve 140 receives an outer conduit or sleeve 150 formed with a stop 152 at the upper end thereof, which stop 152 is formed with an opening 154 for receiving the vertically extending guide rib 146 on the inner conduit 140. Stop 152 cooperates with stop 148 to limit the downward movement of the outer conduit 150 with relation to the inner conduit 140. I provide the outer surface of the outer conduit 150 with an annular guide collar 156 for a reason to be described. I secure a cylindrical rubber spout end 158 to the lower end of the metal outer sleeve by means of half ring clamps 160. The shroud section 34 includes a cylindrical metal sleeve 162 formed with a flange 164 at the upper end thereof. An inner stop 166 on sleeve 162 at the lower end thereof is adapted to limit the downward movement of the shroud 34 with respect to the rest of the assembly. Stop 166 further cooperates with the guide 156 to limit the upward movement of the shroud. I weld or otherwise secure an upper steel skirt 168 to the sleeve 162 around a line intermediate the ends thereof. I provide the upper skirt 168 with a reenforcing hoop extending around the interior surface thereof. A band 174 secures a lower rubber skirt 172 to the lower end of the steel skirt 168. Preferably, I provide the lower edge of the lower rubber skirt with a reenforcing band 176.

A dust collector outlet 178 leads into the interior of the shroud 34 through the steel upper skirt 168. I attach a takeoff tube 180 to the outlet 178 by any suitable means. As will be understood by those skilled in the art, the flexible hose 180 may be connected to a dust removal system of any type known in the art. It will further be appreciated that, owing to the fact that the outlet of the lower end of the assembly is disposed below the hatch entry, while the outlet 178 is located somewhat thereabove, there will not be a great deal of dust which the hose 180 is required to carry away from the hatch area. Moreover, shroud 34 is rotatable relative to member 150 to permit adjustment in accordance with the location of the inlet 78.

Referring again to FIGS. 7 and 8, I provide the apparatus with means for driving the sprocket wheel 62 to rotate the entire assembly 26 through a predetermined angular rotation. Each of the assemblies 26 is either a "right-hand" or "left-hand" assembly, the only difference being the location of the drive. In each instance the "dead area" is adjacent to the centerline of the railway track. Each rotary drive system indicated generally by the reference character 182 of each assembly 26 includes a pitch chain 184 extending around the sprocket wheel 62 and around a sprocket wheel 186 carried by a vertically extending shaft 188 disposed in a housing 190. A second sprocket wheel 192 carried by the shaft 188 for rotation therewith receives a second pitch chain 194. I provide a double acting system including a pair of piston cylinder assemblies for driving shaft 188 to rotate sprocket wheel 62 through a predetermined angular rotation. More specifically, I connect one end of the pitch chain 194 to the piston 198 of a first piston and cylinder assembly 196. In connect the other end of the chain 194 to the piston 202 of a second piston and cylinder assembly 200. Respective ports 204 and 206 lead into the respective cylinders 200 and 196 at the side of each of the associated pistons, while ports 208 and 210 lead into the cylinders 196 and 200 at the other sides of the associated pistons.

I control the operation of the spout assembly rotating mechanism 182 by means of a four-way lever operated spring center return valve 250 of any suitable type known in the art in which, in the spring center return, all ports are blocked. A common line 254 connects one of the outlet ports of the valve 250 to the port 206 of cylinder 196 and to the port 210 of cylinder 200. Another common line 256 connects the other outlet port of the valve 250 to the inlet port 204 of cylinder 200 and to the inlet port 208 of the cylinder 196. As has been explained hereinabove, in the center position of the valve, all of the ports are blocked so that the assembly 26 will be maintained in that position to which it has been rotated. Moreover, lever 252 can be actuated in one direction to connect line 254 to the pressure input port and to connect line 256 to the return input port to rotate the spout assembly in one direction. Conversely, in another position of the valve under the action of the lever 252, line 256 is connected to the pressure side and line 254 is connected to the return side. As has been pointed out hereinabove, the driving arrangement 182 limits the rotation of the associated assembly 26 to approximately 300° of rotation with the center line of the 60° dead area being generally perpendicular to the direction of the track beneath the bin 10.

Figures 6, 13:
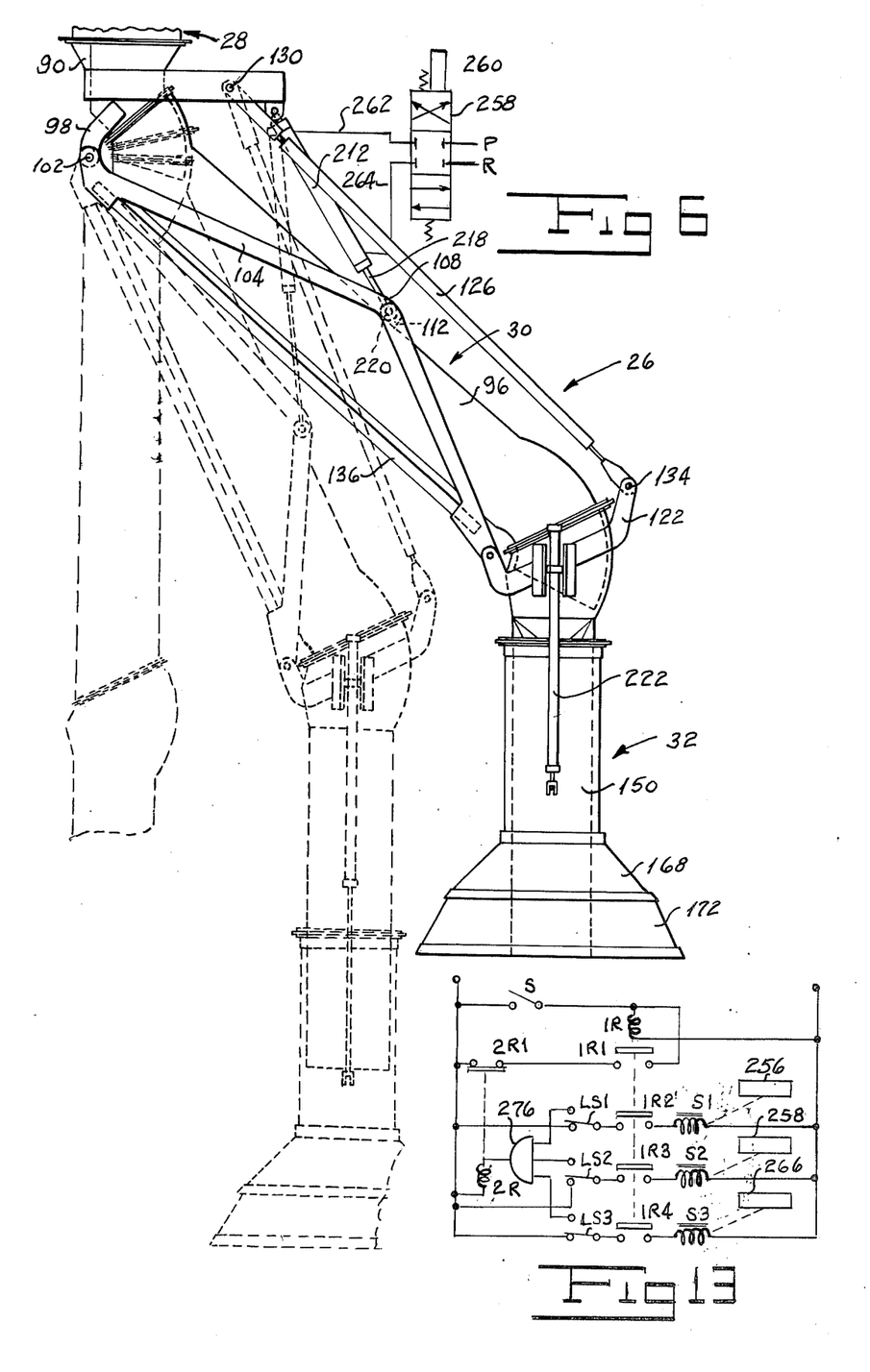
FIG. 6 is an elevation of one of the loading spout assemblies of my system, illustrating various positions of respective parts thereof.
FIG. 13 is a schematic view of a portion of an electrical control circuit which can be used with my loading spout assembly.
Figure 7:
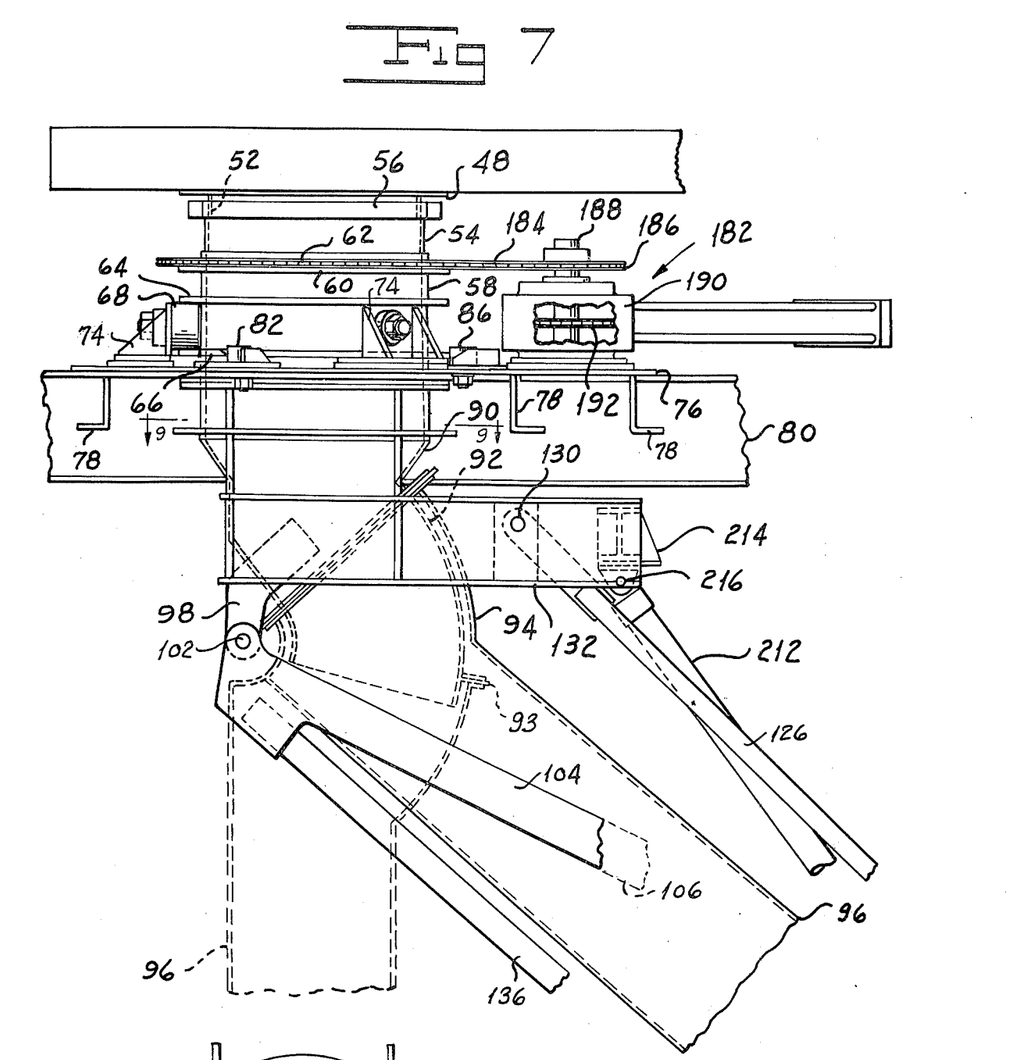
FIG. 7 is a fragmentary elevation of the upper section and of a portion of the intermediate section of one of my loading spout assemblies.
Figure 8:
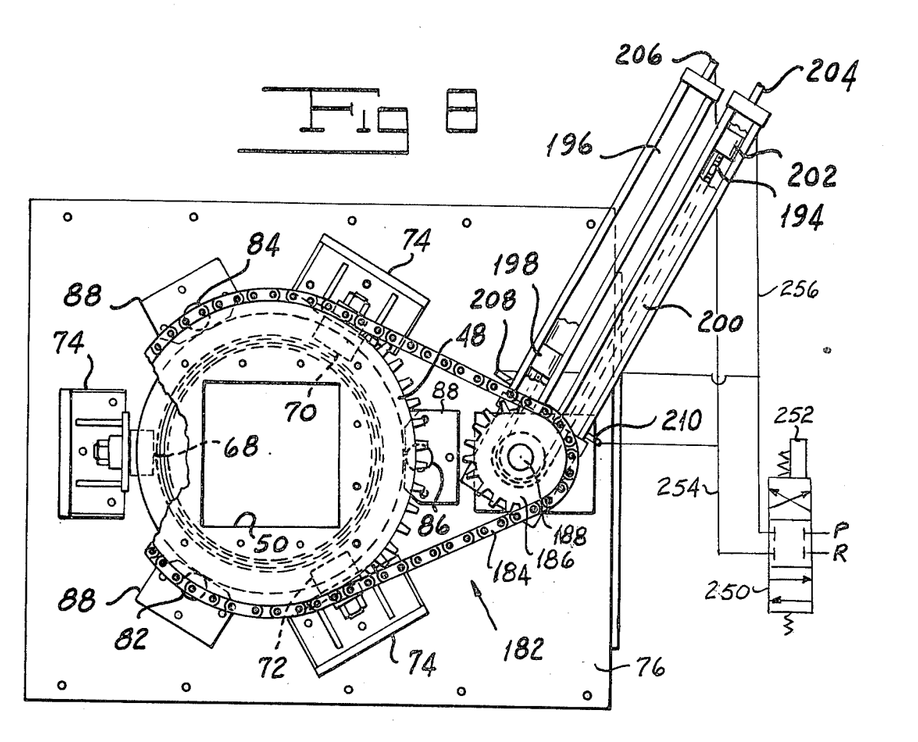
FIG. 8 is a top plan view of the apparatus illustrated in FIG. 7, with parts broken away.
Figure 9:
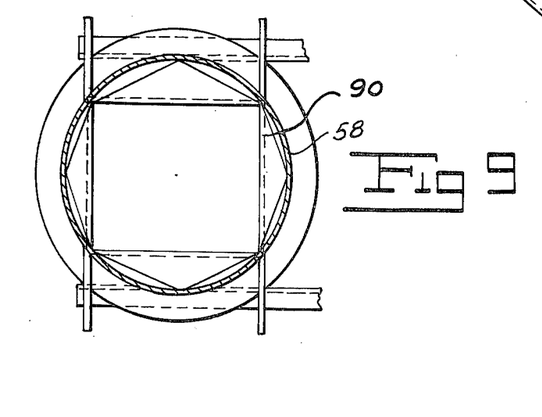
FIG. 9 is a sectional view of the apparatus shown in FIG. 7, taken along the line 9—9 thereof.

Referring to FIGS. 6 and 7, I provide the intermediate section of each of the assemblies 26 with a lifting piston and cylinder assembly 212. I secure one end of the tilting cylinder of the assembly 212 to a bracket 214 by means of a pin 216. The rod 218 of the piston and cylinder assembly 212 is secured to a pin 220 carried by the bracket 112 intermediate the ends thereof.

I control the operation of the lifting cylinder 212 by means of another four-way lever operated spring center return valve 258 in which all ports are blocked in the center position of the valve. A lever 260 may be moved in one direction to connect the pressure port P of the valve 258 to line 262 leading to one input end of the cylinder 212 and to connect a line 264 leading to the other end of the cylinder to the return line R associated with the valve 258. In the other position of the valve, the connections are reversed. When the lever is returned to the neutral or central position, the intermediate section 96 will remain in the relative angular position to which it has been moved with respect to the horizontal.

Referring to FIGS. 10 and 11, I provide respective piston and cylinder assemblies including respective cylinders 222 and 224 for moving the outer sleeve 150 of the lower section into and out of telescoping relationship with the inner sleeve or tubular member 140. Respective brackets 226 and 228 secured to the curved upper part 116 of the lower section carry respective pins 230 and 232 which pivotally support the cylinders 222 and 224. I secure the rods 234 and 236 of the piston and cylinder assemblies to respective pins 238 and 240 carried by brackets 242 and 244 secured to the outer sleeve 150. A spout upper limit switch 246 secured to the lower end of the cylinder 222, for example, is adapted to be actuated by a member 248 on the rod to indicate when the outer sleeve 150 is in its upper limit position.

The operation of the lifting cylinder assembly 222 and 224 is under the control of a third four-way lever operated spring center return valve assembly 266 having a lever 268 adapted to be moved in one direction from center position to connect a common line 270 leading to corresponding ends of the cylinders 222 and 224 to the pressure input to the valve and to connect another common line 272 leading to the other ends of the cylinders 222 and 224 to the return line associated with the valve. When the lever is moved in the other direction from this center position, the connections are reversed. When the handle is restored to the center position, the outer member will remain in the position to which it had been moved. It will be understood that the switch 246 can be connected to disable the valve 266 in any manner known to the art when the upper limit position is reached. I may also provide the bonnet or shroud skirt 172 with a sensing device 274 adapted to be actuated when the shroud has sealed over the inlet opening to the car.

The operation of my system for transferring dry comminuted material from a bin to a railway car will be apparent from the description hereinabove. When a locomotive is to pass beneath the bin 10, each assembly 26 is rotated to a fully outboard position, the outer sleeve 150 is raised to its fully retracted positions and the intermediate section 96 is moved to the full line position illustrated in FIG. 6. In this position of all of the assemblies 26, the locomotive can readily pass through the space under the bin 10 without interference with any of the assemblies. Once the locomotive has passed through and knowing the type of car which is to be loaded, the operator will know the proper angular orientation of each of the assemblies 26 around the vertical axes of their corresponding openings, as well as the radius in a horizontal plane. The valve 250 associated with each of the assemblies can be actuated first to provide the desired angular orientation. Next, the valve 258 associated with the lifting cylinder 212 is operated to provide the correct radius in a horizontal plane. Finally, the valve 226 of each of the assemblies is operated to lower the outer member 150 until the lower rubber 158 of the assembly enters the hatch and the shroud 34 makes a seal with the hatch. This may, for example, be sensed by any suitable device 274 which will indicate some distortion of the rubber skirt 172 resulting from making of the seal. The loading operation then commences with the major part of the movement of the material through each of the assemblies 26 taking place as a sliding action along the intermediate section 96 of rectangular cross-sectional shape.

When one car has been loaded, the next car is to be moved in position for loading. In order to permit this to take place, valve 266 may be actuated to move member 150 and the shroud 34 upwardly for a sufficient distance to permit the hatches of the next car to move into position without interference with the assemblies. However, as is explained hereinabove, in most instances the trains are so made up that a series of cars of the same type are in sequence in the train. Consequently, it normally is not necessary to change the angular orientation of the assembly or the radius arm provided by the angle to which the intermediate section 96 has been moved. That only need be done when a car of a different type is being moved into position.

It is to be noted that, in the course of the loading operation in the spout, sleeve 158 extends downwardly into the hatch, while the skirt 172 makes a seal around the outer edge of the hatch. Owing to the fact that the discharge opening of the sleeve 158 is below the top of the hatch, very little dust accumulates in the space between the skirt 168 and the lower section 150 of the assembly. Any dust which does collect in this space is carried away through the flexible hose 180 to any suitable type of dust-collecting system known in the art.

Figure 1:
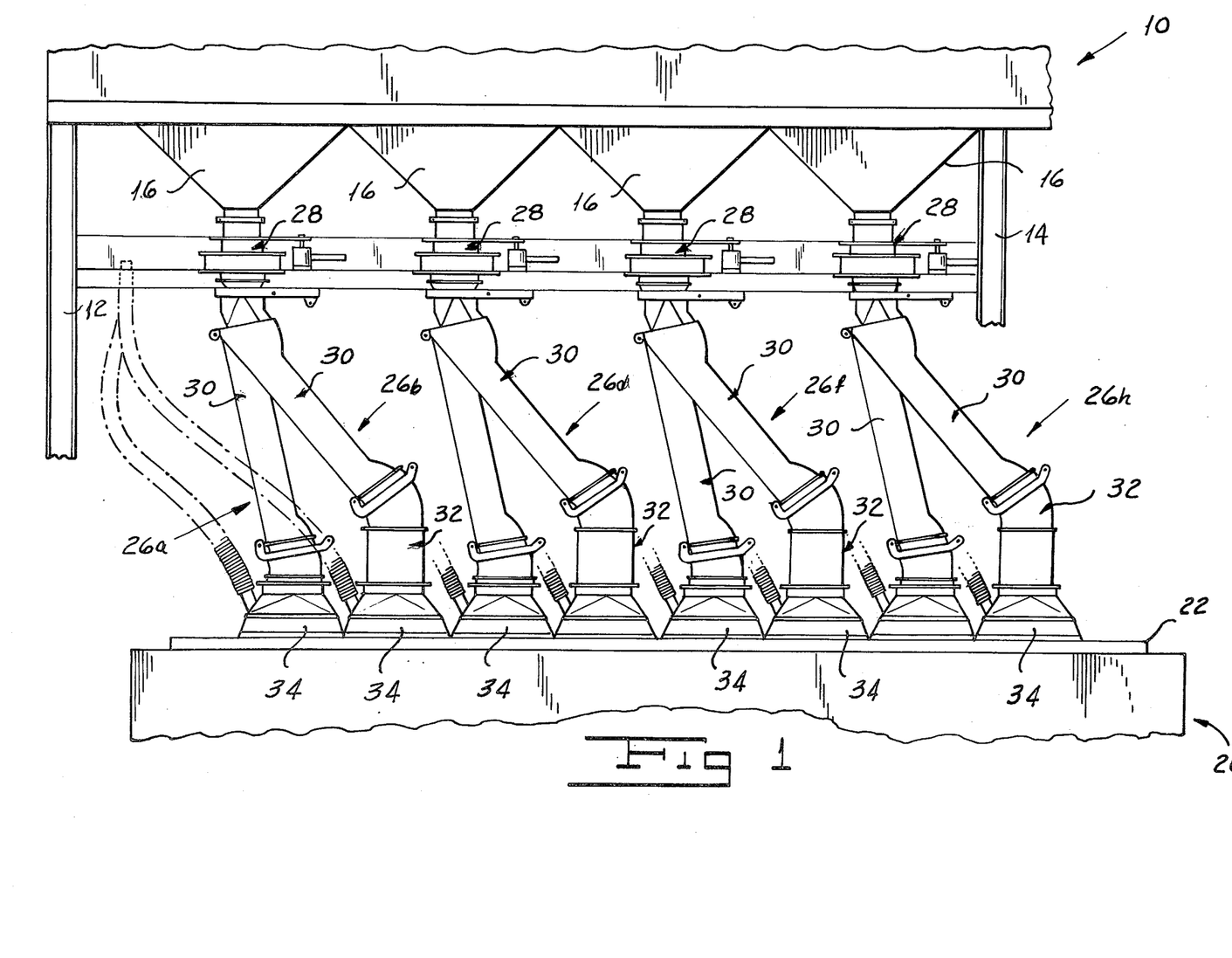
FIG. 1 is a side elevation of a loading station illustrating the relationship between a storage bin, a plurality of my spout assemblies and one type of railway car to be loaded.
Figure 2:
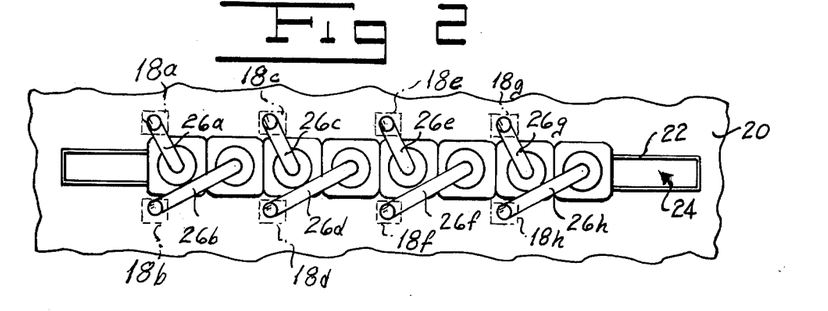
FIG. 2 is a schematic view illustrating the orientation of the various spout assemblies of my loading spout system in use with one type of railway car.

In FIG. 2 the dot-dash lines associated with the various assemblies 26a to 26h indicate the orientation of the assemblies in their respective home positions in one particular installation. As can be seen by reference to FIGS. 2 to 5, in such a typical installation, from its home position to its operative position in association with a car hatch, for every car type to be accommodated, the shroud 168 is moved by rotating the sprocket wheel 62 of each assembly 26a, 26c, 26e and 26g in a clockwise direction as viewed in FIG. 2; by rotating the sprocket wheel of each assembly 26b, 26d, 26f and 26h in a counterclockwise direction as viewed in FIG. 2; by swinging the intermediate section 96 in a clockwise direction around pivot 102 as viewed in FIG. 7, and by lowering section 150 from the position shown in full lines in FIG. 6. This arrangement enables me immediately to restore all assemblies to their home positions as determined by respective limit switches associated with sprocket wheel 62, with intermediate section 96 and with lower section 150, for example, in the event that an attempt is made to move the car while the spout assemblies are in operative positions. Such an emergency operation can be carried out by closing of a single switch in response to movement of the yard locomotive or upon energization of a car hauling winch or the like.

Referring to FIG. 13, by way of example, I have illustrated a control circuit for bringing one of the spout assemblies to its home position in the event that an attempt is made to move the car while the spouts are in operative positions. For example, a switch S, which may be closed upon a slight movement of the car from its loading position or upon energization of a car hauling device or in any other appropriate manner, energizes a relay winding 1R to complete its own holding circuit through a switch 1R1 and a normally closed switch 2R1. At the same time, switches 1R2, 1R3 and 1R4 close to energize respective solenoids S1 to S3 through limit switches LS1, LS2 and LS3 associated, respectively, with the rotating upper section 58, the swinging intermediate section 96, and the vertically movable lower section 150. Limit switches LS1 and LS3 are such that they engage the lower contacts associated therewith when the corresponding member is out of its home position and that they engage the upper contacts associated therewith when the member arrives at its home position. S1 is associated with the valve 250, for example, to rotate the corresponding section 58 in the direction opposite to that in which it was rotated from its home position to its operative position. In a similar manner, solenoids S2 and S3 are associated with valves 258 and 266 to pivot the intermediate section 96 in a clockwise direction around its pivot 102 to its home position and to move the outer sleeve 150 upwardly to its upper limit position shown in FIG. 10. When all of the limit switches LS1 to LS3 have been moved to positions which indicate that the associated members are in their home positions, all inputs are present to a 3 input AND control element 276 to energize a relay winding 2R to open contacts 2R1 to interrupt the holding circuit for winding 1R to deenergize all of the solenoids to permit the corresponding valves to return to their neutral positions.

Owing to the fact that each valve associated with any of the movable elements of my spout assembly must merely be reversed to bring the assembly member back to its home position, the circuit of FIG. 13 can readily be expanded to include all of the spout assemblies at any installation. That is to say, only a single switch need be provided to initiate movement of all of the spout assemblies at any car loading installation back to their home positions. This, moreover, is true of all installations for all of the various types of cars with which my loading spout system is employed.

My system allows a certain leeway in spotting cars at the loading station. That is, where a succession of cars having the same hatch configuration is to be loaded after the spout assemblies 26 have been oriented to accommodate the hatch arrangement for the first car, the particular positions at which the second and subsequent cars are stopped at the loading station is not at all critical. Within limits the difference in stopping locations of subsequent cars can be accommodated by changing the tilt or the telescoping action of the spout assemblies.

Preferably, I provide the telescoping and tilting cylinders of my system with special hydraulic valves (not shown) which lock the cylinders in place should pressure be lost or a hose damaged. This safety feature avoids spilling of oil and the resultant fire hazard as well as preventing dropping of the entire spout assembly on a car. In addition, preferably I provide the hydraulic system with accumulators so sized that, in the event of a power failure, the spouts can still be lifted and rotated away, thus clearing the path of movement of cars.

While I have shown individual manually operatable valves for controlling the various movements of the parts of my assembly, it will readily be seen that the system lends itself to automation. That is to say, computer programming of the various valves to accommodate the different types of cars which will be encountered is readily achieved.

It will readily be appreciated that in the course of loading the car much air must be removed as material is loaded into the car. This is facilitated in my arrangement by the takeoff hoses 180 which carry air away from the shrouds 34. It is to be emphasized that my loading system and in particular each of the assemblies 26 ensures that the material slides along the central section over the major part of the distance it must move from the outlet opening 18 to the car hatch. Owing to the fact that the material slides over the major portion of its movement, turbulence is greatly reduced and the generation of dust is minimized. I have discovered that even at very small angles to the vertical of the intermediate sections 30, turbulence is so slight that very little dust is generated.

It is to be noted further in my system that the support for each of the assemblies 26 provided by the rollers 68, 70, and 72 which rotate around horizontal axes and the edge rollers 82, 84, and 86 which rotate around vertical axes are adapted to take up the eccentric forces resulting from the orientation of the intermediate section with reference to the vertical. In addition, the provision of the rubber skirt 172 on the shroud permits of some misalignment of the hatch openings from the positions which they would occupy if the car were properly spotted with respect to the outlet openings of the hoppers 16. Moreover, I so size the skirts 172 as to accommodate the largest hatch opening which will be encountered.

It will be seen that I have accomplished the objects of my invention. I have provided a loading spout system for transferring comminuted dry material from a bin to a railway car without polluting the ambient atmosphere with the material being loaded. My system meets industry's standards for minimizing pollution. It is adapted for use with a wide variety of railway cars, respective ones of which have different hatch configurations and hatch openings of different heights. My system ensures that dry material being transferred from a bin to a car slides over the major distance between the bin outlet opening and the car, rather than being dumped directly vertically from the bin into the car. My system readily lends itself to automated operation. It is provided with means for minimizing the danger of injury to workers at the installation. The spout assemblies of my system can readily be moved to positions at which they permit of the passage of a locomotive through the space beneath the bin. My system permits of the rapid withdrawal of all spout assemblies from operative association with a car being loaded to home positions in response to any movement of the car being loaded so as to avoid damage to the assemblies.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for conducting dry comminuted material from a bin opening at one level to the opening of a hatch at a given position at a second level including in combination, a frame, an upper conduit, means mounting said upper conduit on said frame at a position to receive material discharged through said opening and for rotary movement around the vertical centerline of said opening, an elongated intermediate conduit, means connecting said intermediate conduit to said upper conduit for swinging movement around a generally horizontal axis, means for moving said upper conduit around said opening axis while moving said intermediate conduit around said horizontal axis so that material slides through said intermediate conduit and whereby the position of the lower end of said intermediate conduit can be described in terms of polar coordinates in a plane of projection in which said end can be moved to a location corresponding to said given position, a pair of lower conduits, means mounting said lower conduits for telescoping movement relative to each other, means connecting one of said lower conduits to the lower end of said intermediate conduit for pivotal movement around a generally horizontal axis, means for moving said lower conduits relative to each other to move the lower end of the other lower conduit into said hatch opening, and a parallelogram linkage mechanism for positively maintaining said lower conduits parallel to said upper conduit.

2. Apparatus as in claim 1 including a shroud extending around said lower end of the other lower conduit, said shroud adapted to engage said hatch as said lower end moves into said opening.

3. Apparatus as in claim 2 including a sleeve of resilient material at the lower end of the other lower conduit and a skirt of resilient material on said shroud.

4. Apparatus as in claim 1 including means for limiting the rotary movement of said upper conduit.

5. Apparatus as in claim 1 in which said intermediate conduit has a rectangular inner cross-sectional shape and in which each of said upper and lower conduits have portions with circular inner cross-sectional shapes.

6. Apparatus as in claim 2 including means for withdrawing air from the space between said shroud and the lower end of the other lower conduit.

7. Apparatus for conducting dry comminuted material from the respective discharge openings of a bin having a preset pattern of discharge openings at a first level to the hatch openings of cars having various patterns of hatch openings including in combination a frame, a plurality of material transfer spout assemblies each of said assemblies comprising an upper conduit, means mounting said upper conduit on said frame at a position to receive material discharged through one of said openings and for rotary movement around the vertical centerline of said opening, an elongated intermediate conduit, means connecting said intermediate conduit to said upper conduit for swinging movement around a generally horizontal axis, means for moving said upper conduit around said opening axis while moving said intermediate conduit around said horizontal axis so that material slides through said intermediate conduit and whereby the position of the lower end of said intermediate conduit can be described in terms of polar coordinates in a plan of projection in which said end can be moved to a location corresponding to the position of one of said hatch openings, a pair of lower conduits, means mounting said lower conduits for telescoping movement relative to each other, means connecting one of said lower conduits to the lower end of said intermediate conduit for pivotal movement around a generally horizontal axis, means for moving said lower conduits relative to each other to move the lower end of the other lower conduit into said one hatch opening, each of said upper conduit and said intermediate conduit and said lower conduits having home positions out of operative association with a car being loaded and from which positions all are moved in the same direction to accommodate care of various types, said apparatus including means responsive to initiation of movement of a car being loaded for actuating said conduit moving means to restore said conduits to said home positions.

8. Apparatus as in claim 7 in which a plurality of said spout assemblies are similarly oriented when in operative relationship with a car having any particular hatch configuration.

9. Apparatus as in claim 7 in which said bin openings are arranged along each side of a centerline along which said car moves.

10. Apparatus as in claim 7 in which each of said upper conduit and said intermediate conduit and said lower conduits have home positions out of operative association with a car being loaded and from which positions all are moved in the same direction to accommodate cars of various types, said apparatus including means responsive to initiation of movement of a car being loaded for actuating said conduit moving means to restore said conduits to said home positions.

11. Apparatus for conducting dry comminuted material from a bin opening at one level to the opening of a hatch at a given position at a second level including in combination, a frame, an upper conduit, means mounting said upper conduit on said frame at a position to receive material discharged through said opening and for rotary movement around the vertical centerline of said opening, an elongated intermediate conduit, means connecting said intermediate conduit to said upper conduit for swinging movement around a generally horizontal axis, means for moving said upper conduit around said opening axis while moving said intermediate conduit around said horizontal axis so that material slides through said intermediate conduit and whereby the position of the lower end of said intermediate conduit can be described in terms of polar coordinates in a plane of projection in which said end can be moved to a location corresponding to said given position, a lower conduit having a discharge opening adapted to move into said hatch, means connecting said lower conduit to the lower end of said intermediate conduit for pivotal movement around a generally horizontal axis, and a parallelogram linkage mechanism for positively maintaining said lower conduit parallel to said upper conduit.

12. Apparatus as in claim 11 including a hood surrounding said discharge opening, said hood adapted to cover said hatch as said discharge opening moves into said hatch opening.

13. Apparatus as in claim 11 in which said intermediate member has a rectangular interior cross-sectional shape.

14. Apparatus as in claim 11 in which said member has a rectangular interior cross-sectional shape, said upper conduit having an interior generally circular cross-sectional shape and means providing a transition from said circular to said rectangular shape.

15. Apparatus as in claim 14 in which said lower conduit has a generally circular cross-sectional shape at said discharge opening and means providing a transition from said rectangular to said circular cross-sectional shape.

16. Apparatus as in claim 11 including a second lower conduit, means mounting said lower conduits for movement into and out of telescoping relationship with each other, and means for moving said lower conduits relative to each other.

17. Apparatus as in claim 11 in which said mounting means comprises, a pair of spaced flanges on said upper conduit, a first set of rollers disposed between said flanges and means mounting the rollers of said first set on said frame for movement around respective horizontal axes.

18. Apparatus as in claim 17 in which said mounting means comprises a second set of rollers and means mounting the rollers of said second set on said frame for movement around vertical axes at locations at which they engage the edge of one of said flanges.

* * * * *